United States Patent [19]
Rehhoff

[11] Patent Number: 5,993,223
[45] Date of Patent: Nov. 30, 1999

[54] ENCLOSURE FOR A TRANSMITTER, PARTICULARLY A PRESSURE TRANSMITTER

[75] Inventor: Peter Bjørn Rehhoff, Sønderborg, Denmark

[73] Assignee: Danfoss A/S, Nordborg, Denmark

[21] Appl. No.: 08/972,820

[22] Filed: Nov. 18, 1997

[30] Foreign Application Priority Data

Nov. 20, 1996 [DK] Denmark ................................ 1326/96

[51] Int. Cl.⁶ .................................................. H01R 9/09
[52] U.S. Cl. ............................................ 439/76.1; 439/95
[58] Field of Search ...................................... 439/95, 76.1

[56] References Cited

U.S. PATENT DOCUMENTS

| | | | |
|---|---|---|---|
| 4,128,006 | 12/1978 | Grabow | 73/724 |
| 4,918,833 | 4/1990 | Allard et al. | 29/621.1 |

Primary Examiner—Michael L. Gellner
Assistant Examiner—Antoine Ngandjui
Attorney, Agent, or Firm—Lee, Mann, Smith, McWilliams, Sweeney & Ohlson

[57] ABSTRACT

An enclosure for a transmitter, particularly a pressure transmitter, comprising an upper part containing connection terminals and an outer enclosure connected with the upper part. A printed circuit board is mounted in the chamber formed by the upper part and the outer enclosure. To increase the immunity of the pressure transmitter from electrical noise, an inner conducting cylinder is used, the cylinder being fixed by a pressure fitting with the outer enclosure. At the same time stampings in the inner cylinder fix the printed circuit board and create earth connection from the printed circuit board via the inner cylinder to the outer enclosure. Besides improving the noise immunity, the invention simplifies assembly of the transmitter and increases mechanical strength, including resistance towards turning and tilting torques.

14 Claims, 3 Drawing Sheets

ENCLOSURE FOR A TRANSMITTER, PARTICULARLY A PRESSURE TRANSMITTER

BACKGROUND OF THE INVENTION

The invention concerns the enclosure for a transmitter of the cylinder type, i.e. axial transmitters having mainly a cylindrical enclosure with measuring cell and electronics fitted inside the enclosure and electrical connection terminals or cable inlet in one end of the enclosure.

The invention concerns all transmitters of the cylinder type, however, in the following it will be described by way of a pressure transmitter.

Pressure transmitters usually send a 0 to 20 mA or a 0 to 10 V signal, and are often used in electrically noisy environments. To avoid an interference with the measuring signal, an electrical screening is vital, and today it is customary to make large frame or earth planes by designing the printed circuit board (PCB) with large earth areas and connecting this area electrically with the outer transmitter enclosure. The enclosure thus consists of a metal housing acting as a large screening area. The state of the art usually solves the problem of getting the PCB frame or earthing led out to the enclosure by providing an expensive, separate frame connection, often in the shape of a metallic tongue soldered to PCB and enclosure, respectively.

U.S. Pat. No. 4,888,662 describes a high pressure transducer of the cylinder type, and the problem solved is to isolate the electronics unit and a plastic part comprising electric terminals from the pressure sensor itself, to protect against high pressures. This is done by providing a metallic chamber inside the outer metallic enclosure, which metallic chamber contains the sensor element, while the outer enclosure is crimped around the plastic part with the electric cables. To provide screening against electric noise, the PCB earth plane is connected to both the inner chamber and the outer enclosure through a metallic tongue soldered on the PCB, touching the inner chamber and crimped together with the outer enclosure. The disadvantage of this construction is that a separate earth conductor must be led to the outer enclosure, which makes fitting difficult.

EP 0 372 773 describes a pressure transducer containing two substantially circular PCBs, which are connected by a flexible intermediary piece enabling the folding of the two PCB over each other. To reduce the influence from electric noise, an earth tongue projects from each of the two PCB. A capacitor is soldered onto each of these tongues and connected to the earth plane of the enclosure. In another embodiment (FIG. 6) the long earth tongue is crimped together with the outer enclosure during the final assembly of the transducer, by which the earth connection is established. The establishment of the earth connection thus requires either at least two solderings or a crimping, which, in the embodiment shown, may lead to leakage between the tongue and the outer enclosure.

For mounting reasons solder-free electrical connections are preferred, and snap and clip connections utilising the resilient properties of the contactors are widely used.

Thus, EP 0 691 533 describes an axial pressure transducer assembled without soldering. The pressure transducer comprises a cylindrical intermediary piece of a synthetic material, having a recess, in which a rectangular PCB is arranged. The cylindrical piece functions as connector for the electrical connection terminals coming from the supply, the signal and the sensor sides, and the characteristic feature of the construction is that the electrical connections are established without soldering, but only by male parts being led into female parts, by which the electrical connection is established by means of spring effect. On one edge of the PCB there are four printed circuit conductors connected with the electronics on the PCB, and when assembling the pressure-transducer, a lower part comprising the sensor element and four L-shaped metal terminals is led into the cylindrical intermediary piece, so that the L-shaped terminals slide against printed circuit conductors on the PCB edge and create electrical contact. EP 0 691 533 does not describe any measures to be taken to reduce the sensitivity to electrical noise.

Finally, U.S. Pat. No. 4,918,833 describes a method of assembling an electronic transducer comprising a PCB, in which the PCB is fixed on top of a sensor element by means of spring clips. In a special embodiment the PCB is retained by five U-shaped spring clips, jamming around the edge of the PCB. Further to the fixing effect, the clips are in touch with conductor lanes led out to the edge of the PCB, by which they create electrical connection to the underlying sensor, to which the clips are soldered.

Further, the transducer described in EP 0 691 533 suffers from a disadvantage shared by many transducers, viz. that a tilting torque exerted on the top part of e.g. a connection cable mounted in the cable plug will be able to tilt the top part out of the hold provided by the outer enclosure. If the top part tilts to one of the sides, a humidity passage leading to the PCB can be created between the outer enclosure and the top part.

SUMMARY OF THE INVENTION

The task of the invention is to make a solution avoiding the mentioned disadvantages of the state of the art.

This is done by designing a transmitter having an outer enclosure or cylinder and an inner cylinder, by which the inner cylinder at the same time creates frame or earthing contact, fixes the PCB and stabilises the mechanical construction. The transmitter comprises an upper part containing electrical terminals and a first electrically conducting cylinder, which is mechanically connected with the upper part and surrounds it closely, and inside the chamber formed by the upper part and the first cylinder a PCB is fitted, which is electrically connected with the terminals of the upper part and with the first cylinder.

The transmitter is characterised in that the electrical connection between the first cylinder and the PCB is obtained through a second electrically conducting cylinder having resilient contact areas for obtaining electrical connection to the PCB.

A transmitter made as described above gives an improved frame or earth contact and thus less sensitivity towards electrical noise. The fitting and assembly process of the transmitter is substantially simplified, as the manual activity in connection with the establishment of the frame connection is no longer required, and also the relatively expensive frame tongue can be done away with. Further, the transmitter PCB is kept fixed, and is relieved of pressure influences from the enclosure. Finally, the use of an outer and an inner cylinder gives a higher degree of mechanical stability and strength, which makes the enclosure resistant to turning and tilting torques.

BRIEF DESCRIPTION OF THE DRAWING

The invention is described on the basis of the following drawings, showing.

DESCRIPTION OF THE PREFERRED EMBODIMENTS

Figure 1:
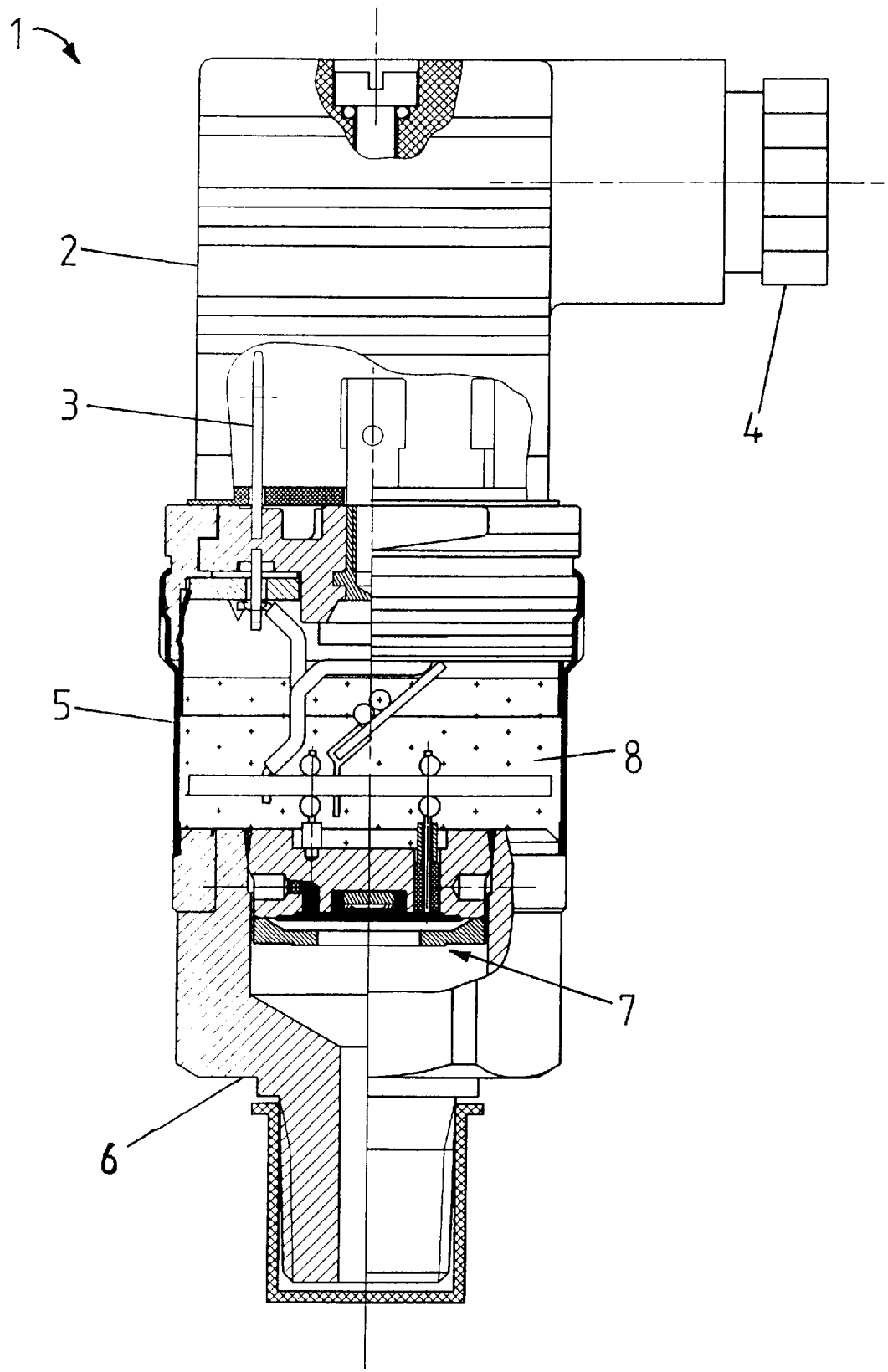
FIG. 1 A section of the pressure transmitter in accordance with the invention

FIG. 1 shows a pressure transmitter 1 in accordance with the invention. The upper part or end piece 2 comprises the connection terminals 3, to which cables led through the cable entry 4 are soldered. An outer enclosure or outer cylinder 5 made of stainless steel connects the upper part of the transmitter with its lower part 6, which comprises the sensor element 7. A sealing silicone substance 8 is inserted between the lower and the upper parts of the transmitter and marked with a +.

Figure 2:
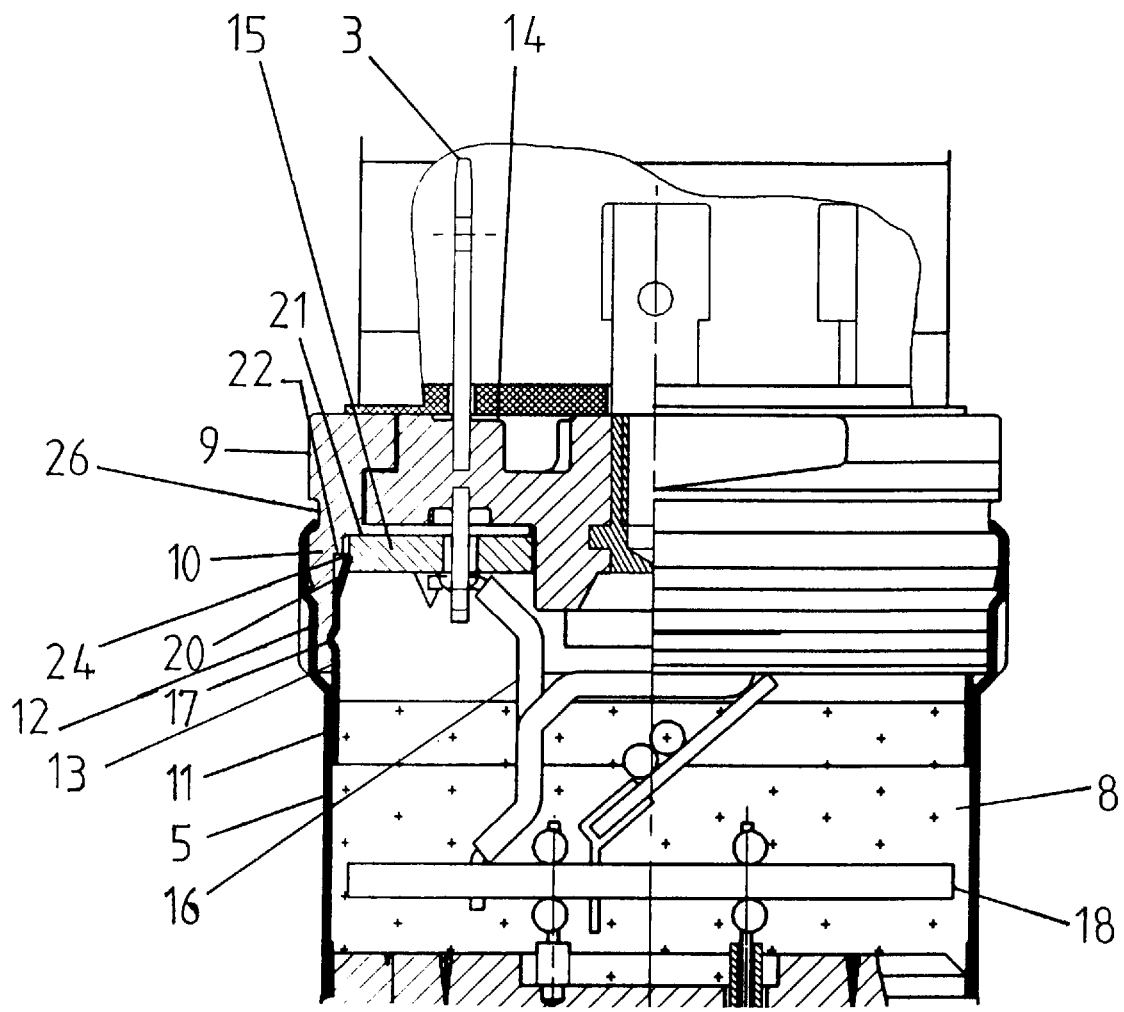
FIG. 2 A section of the pressure transmitter in FIG. 1

FIG. 2 is an enlarged section of the pressure transmitter. The bracket 9 with the sleeve 10 and the terminal part 14 consist of a hard synthetic material. The bracket 9 is preferably in the form of a plastic part. The terminals 3 are led to the PCB 15 through the terminal part 14. An outer cylinder 5, which is the enclosure of the pressure transmitter, surrounds the plastic part 9 closely and is flanged around a recess 26 in the plastic housing for tight closing. An inner cylinder 13, which is smaller than the outer cylinder, is fixed in a pressure fitting so that in a partial area 11 it is in touch with the outer cylinder. The cylinder 13 has an enlargement or bead 17, which projects from the outside of the inner cylinder, and acts as damp barrier. Via the cables 16 the PCB 15 is connected to a second PCB 18, receiving and amplifying the measuring signals.

Figure 3:
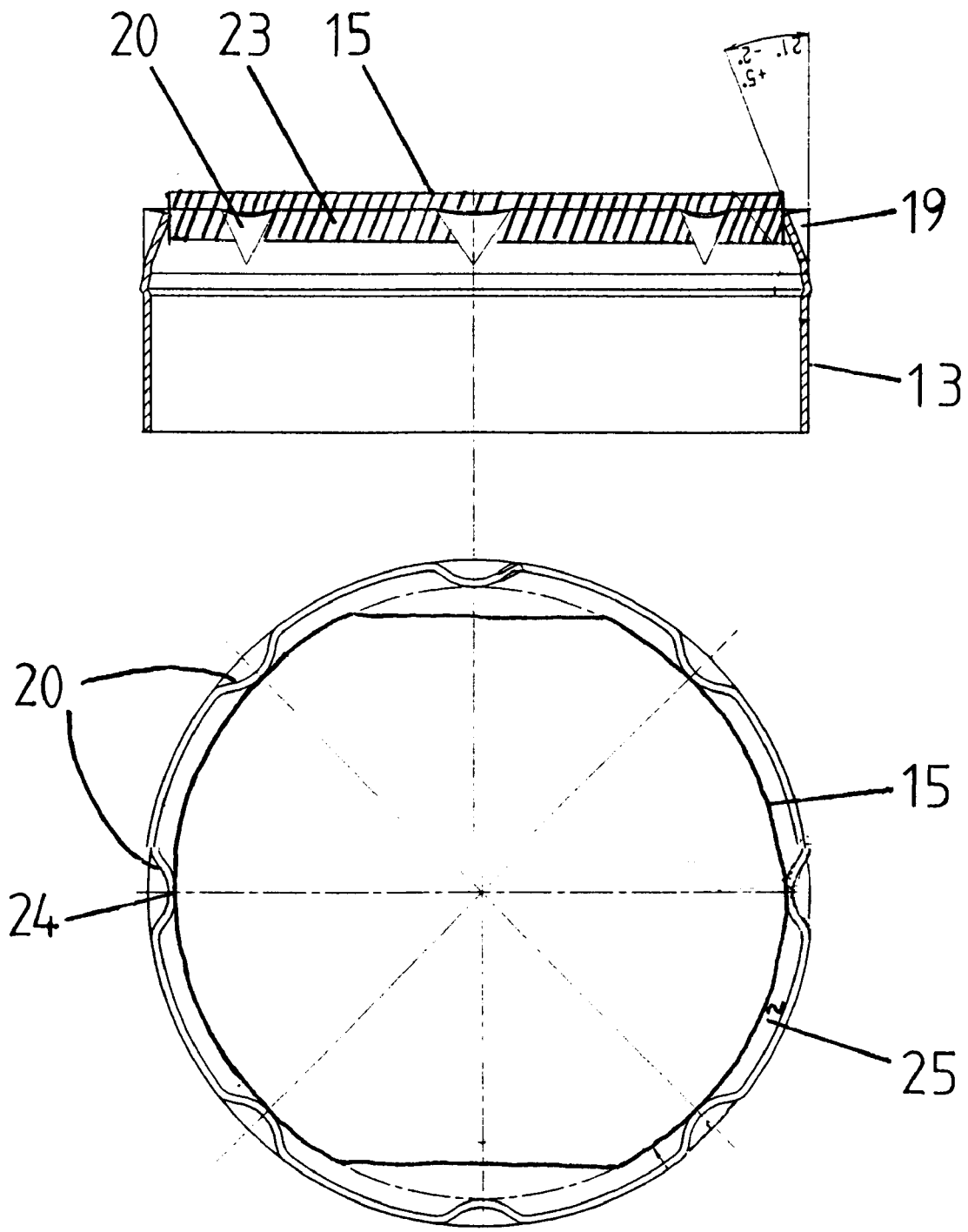
FIG. 3 The inner cylinder of the transmitter with stampings

FIG. 3 shows the inner cylinder 13 from the top with fixed PCB 15, and provided with eight stampings or protrusions 20, which are directed towards the centre of the cylinder. The PCB is substantially circular. The upper edge of the cylinder 13 with stampings has the shape of a rosette. The stampings have two functions, viz. to act fixingly and centeringly on the PCB, when it is fixed in the rosette, while the second function is to create the electrical contact to the PCB 15, which, in this embodiment, is provided with a conducting earth plane 23 on the edge. The inner cylinder 13 with the stampings 20 is preferably made of a resilient material, e.g. tin bronze, which gives a constantly high contact pressure against the edge of the PCB and a flexibility during radial force influences, which spares the PCB. Instead of making the whole inner cylinder 13 of one material, it is possible only to make the rosette part of a resilient material, while the rest of the cylinder is made of a more rigid material to increase the mechanical stability.

On the rosette-shaped part of the inner cylinder 13 the stampings 20 are distributed evenly on the cylinder circumference, by which they are in touch with the PCB in the points 24, and cavities 25 exists between the points 24. For obtaining a good contact pressure, it is important that the stampings have the correct shape. A soft contour gives good connections, whereas too sharp contours, e.g. a pure triangle shape, will be too rigid and inelastic. When the PCB is heated and changes its length, the stampings must change too, to maintain the correct pressure. This can be obtained by shaping the stampings with soft contours, as shown, and by selecting a material with a suitable resilience characteristic, e.g. a tin bronze alloy. The stampings are made at an angle 19 of twenty-one degrees in relation to the outer edge of the cylinder. In the embodiment example the contact pressure changes between 1.5 and 0.8 kg, and practice has proved that the contact pressure is so high that the stampings dig into the earth plane of the PCB and secure a good electrical connection.

The elasticity of the rosette is therefore an advantage, when, due to temperature fluctuations, the PCB either contracts or expands. Neither will radial force influences be transferred to the PCB, as they are absorbed by the resilient rosette. Also during assembly the elasticity is advantageous, as heavy requirements on tolerances are not necessary; the diameter of the PCB may e.g. deviate by ±0.2 mm, and the rosette will automatically adapt.

Assembly of the pressure transmitter takes place in that initially the inner cylinder 13 is pressed into the plastic part 9 until it bears against the edge 22. Then the PCB 15 is led through the inner cylinder until it bears against the edge 21, meaning that the contact point 24 of the stampings is in the middle of the PCB edge. Then the outer cylinder 5 is mounted over the sleeve 10 of the part and flanged onto the edge of the recess 26.

The diameters of both inner and outer cylinder are dimensioned so that the inner cylinder and the PCB are fixed by pressure fitting, which solves both mechanical and electrical tasks. In the embodiment shown, the outer cylinder diameter is larger than the inner cylinder diameter, while the inner cylinder has substantially two diameters, of which the first diameter is larger than the second one, and in touch with the outer cylinder, whereas the second diameter is in touch with the PCB and is smaller than the PCB diameter. The second diameter is formed by the eight stampings 20, whose top points combine to a circle. When the PCB is fitted, it will be clamped in the second diameter, i.e. between the eight stampings. The embodiment example describes a circular PCB, but it is also possible to use a rectangular PCB, which is retained by resilient stampings. The inner cylinder 13 must then have the shape of a cylinder with one end closed, except for an opening in the closed surface for fitting of the rectangular PCB. The resilient contact areas are distributed around the edge of this opening, and the slightly larger PCB is wedged between these.

During fitting of the inner cylinder 13, the bead 17 is pushed into the plastic sleeve 10 and closes so tightly that it prevents moisture from penetrating the inside of the transmitter. Experiences with a smooth cylinder without sealing bead have shown that humidity problems may occur, but the solution shown provides an enclosure corresponding to IP67. The electrical function of the pressure fitting is met in the contact area 11, where the inner and the outer cylinders have a common electrical contact surface, and where, out of regard for noise problems, it is important that this surface is as large as possible. In the embodiment example the height of the outer cylinder is 22.5 mm and the height of the inner cylinder is 10 mm. If a larger earth plane is desired, the inner cylinder can easily be extended. It is also possible to reduce the height of the cylinder 13, so that the cylinder approaches a ring-shape with stampings 20.

From FIGS. 1 and 2 it appears that the transmitter is resistant to both turning and tilting torques. A tilting torque originating from the cable entry 4 will not be able to strip the upper part off the enclosure, as the sleeve 10 is firmly supported by the outer cylinder 5 and the inner cylinder 13, in which the latter is firmly held by a pressure fitting in the common contact area 11. Protection against turning torques is obtained by a combination of the bead 17 and a stamping 12 in the outer enclosure, which thus bites on to the plastic sleeve 10.

I claim:

1. Transmitter with an end piece and having embedded electrical terminals and a first electrically conducting cylinder, the first electrically conducting cylinder being tight-fitting and mechanically connected to the end piece, and having a printed circuit board fitted in a chamber formed by the end piece and the first cylinder, the printed circuit board being electrically connected to the terminals and electrically connected to the first cylinder, the electrical connection between the first cylinder and the printed circuit board comprising a second electrically conducting cylinder having resilient contact areas for obtaining electrical connection to the printed circuit board.

2. Transmitter according to claim 1, in which the first cylinder forms an outer enclosure of the transmitter and the second cylinder forms an inner cylinder of the transmitter, the inner cylinder having a common contact surface with the outer enclosure.

3. Transmitter according to claim 1, in which the second cylinder has a bead around the cylinder forming a damp barrier.

4. Transmitter according to claim 1, in which the inner cylinder is made of a tin bronze alloy.

5. Transmitter according to claim 1, in which the resilient contact areas are distributed around an opening in the second cylinder and by spring-force retain the printed circuit board.

6. Transmitter according to claim 5, in which the resilient contact areas on the second cylinder form the electrical connection to the printed circuit board by contacting a conducting earth plane located on an edge of the printed circuit board.

7. Transmitter according to claim 6, in which the resilient contact areas define a substantially circular area for admission of a circular printed circuit board.

8. Transmitter according to claim 7, in which the resilient contact areas are shaped so that they maintain a predefined minimum contact pressure against the printed circuit board conductors independent of the movement of the printed circuit board.

9. Transmitter according to claim 8, in which the resilient contact areas are shaped as stampings, fixing the printed circuit board and creating electrical connection to it.

10. Transmitter according to claim 9, in which the stampings are directed towards the center of the second electrically conducting cylinder and evenly distributed around the cylinder circumference.

11. Transmitter according to claim 6, in which the resilient contact areas define a substantially rectangular area for admission of a rectangular printed circuit board.

12. Transmitter according to claim 11, in which the resilient contact areas are shaped so that they maintain a predefined minimum contact pressure against the printed circuit board conductors independent of the movement of the printed circuit board.

13. Transmitter according to claim 12, in which the resilient contact areas are shaped as stampings, fixing the printed circuit board and creating electrical connection to it.

14. Transmitter according to claim 13, in which the stampings are directed towards the center of the second electrically conducting cylinder and evenly distributed around the cylinder circumference.

* * * * *